Oct. 24, 1967   J. A. FRYE   3,348,569
VALVES
Filed Nov. 30, 1964

INVENTOR
JAMES A. FRYE

BY Burns, Doane, Benedict, Swecker & Mathis

ATTORNEYS

United States Patent Office 3,348,569
Patented Oct. 24, 1967

3,348,569
VALVES
James A. Frye, Duncan, Okla., assignor to Halliburton
Company, Duncan, Okla., a corporation of Delaware
Filed Nov. 30, 1964, Ser. No. 414,594
5 Claims. (Cl. 137—269.5)

This invention pertains to improvements in valves and, more particularly, to fluid valves of the swing or clapper type.

Swing-type valves have heretofore been available for checking or prohibiting backflow of fluids in conduits. Such valves usually comprise a valve body with opposed inlet and outlet passageways and a clapper interposed therebetween. The clapper usually has a seal ring on the inlet side thereof and is pivotally mounted within the valve body so as to sealingly abut the inlet passage in its lower or closed position but to be pivotable to a raised or open position when fluid flow is forced into the inlet passageway. Should fluid flow into the inlet passageway cease, or flow of the fluid back through the inlet passageway is prevented by virtue of the fact that the clapper pivots to its lower or closed position, by the force of gravity and by back pressure of the fluid, to be held in sealing contact with a seat at the inlet passageway.

When such swing-type valves are utilized in oil pipelines, or the like, wherein abrasive-laden fluid may be encountered, a projecting nose is frequently provided on the inlet side of the clapper. Upon the passage of fluid through the inlet, this fluid impinges against the nose to swingingly raise the clapper to a higher than usual, open position and thereby prohibit direct jet impingement on, and consequential wear of, the clapper seal. Also, because of the occasional presence of "pigs" or "scrapers" or cleaning or gauging devices in the fluid flow, provision is sometimes made to insure that the clapper is raised to a still higher than usual, open position to prohibit interruption in the flow of such objects through the valve. Such valves, as have heretofore been available, have not always been satisfactory for a number of reasons. For example, such valves have not been conveniently and efficiently reversible for checking backflow in either direction through the valve as might be desired upon the changing of the direction in which fluid is being pumped through the conduit. Also, the suspension of such valves has not always been such as to permit raising the clapper to an unusually high, open position but at the same time to guard against, or compensate for, misalignment of the clapper in the lower or closed position. Further, the valves heretofore available have not always provided an efficient seal in the event of wear, deformation or misalignment of various of the elements such as the clapper seal, and the like. Finally, the valves heretofore available have frequently been complicated and difficult to assemble and disassemble as for inspection, maintenance or reversal.

In recognition of the need for an improved swing-type valve of the type heretofore described, it is an object of the present invention to provide such swing-type valves which substantially obviate or minimize problems such as those previously noted.

It is a particular object of this invention to provide a swing-type valve that is conveniently and efficiently reversible to permit or prevent flow in either direction through the valves heretofore discussed.

It is another object of this invention to provide such a valve that may be raised to an unusually high, full-open position but at the same time is supported in such a manner so as to guard against, or compensate for, misalignment of the clapper in the lower or closed position.

It is also an object of this invention to provide such a valve requiring minimum space but provoking minimum resistance to flow therethrough.

Another object of this invention is to provide such a valve that is not prone to sealing inefficiencies generated by wear, deformation or misalignment.

It is still another object of this invention to provide such a swing-type valve that is uncomplicated and convenient to disassemble and reverse, and to reassemble with minimum alignment problems.

In achieving these and other objects as will become apparent hereinafter the present invention provides a swing-type valve comprising a valve body having first and second fluid passageways in fluid communication with a bore having a longitudinal axis intermediate of and transverse to said passageways, the bore being open in at least one longitudinal end thereof. An insert is rotatably mounted in the bore for linear movement longitudinally of the bore. The insert is provided with first and second ports in fluid communication with an insert bore, each of the ports being registrable with either of said first or second passageways. Means are provided for restraining rotation of the insert relative to the bore and a clapper assembly is positioned within the insert bore so as to be registrable with one of the ports thereof.

A clapper support assembly may be provided for rotatably supporting the clapper within the insert bore for linear movement in directions transverse and parallel to the longitudinal axis of the bore, and a valve cap is removably mounted in the open end of the bore for limiting linear movement longitudinally of the bore of each of said insert and said clapper and to facilitate clapper reversal.

The valve body cap may be so designed as to contact the entire periphery of the upper end of the insert to guard against misalignment in either clapper position and the insert may be provided with a transverse, U-shaped recess for supporting a transverse clapper shaft retained therein by the valve body cap.

The insert may be also provided with a lower base wall having a bore therethrough to prevent trappage of fluid beneath the base wall to thereby aid in assembly and subsequent alignment of the insert in the valve body. Also portions of the insert may be constructed to permit utilization of a relatively enlarged clapper to reduce flow restriction.

Further, the clapper may be adjustably slidably mounted on the clapper support shaft, the shaft being rotatably and lineally moveable in a transverse, U-shaped recess in the upper end of the insert, to guard against or compensate for wear, deformation and consequential sealing inefficiencies.

In describing the invention, reference will be made to a preferred embodiment illustrated by way of example in the accompanying drawings, in which.

Figure 1:
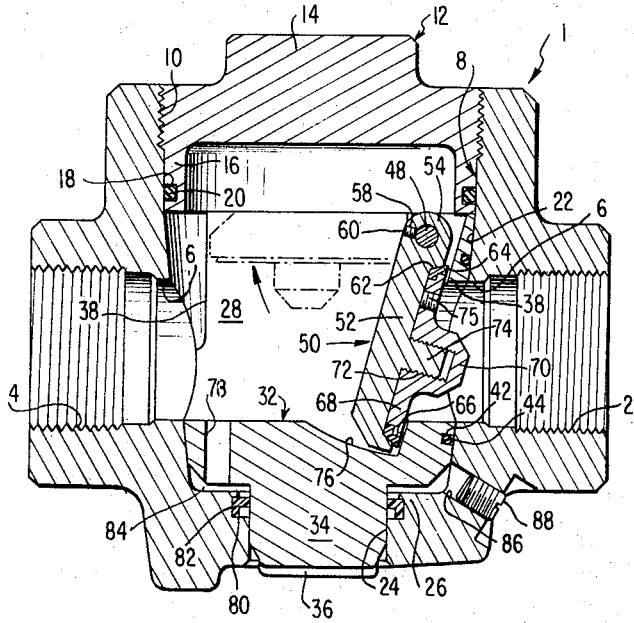
FIGURE 1 is a vertical, cross-sectional view of a swing-type valve according to the present invention.

Referring in more detail to FIGURE 1 of the drawings, a swing-type or clapper valve according to the present invention comprises a metallic valve body 1 having longitudinally aligned but opposed circular, threaded inlet and outlet passages 2 and 4, respectively, either of which is adapted for connection to threaded ends of fluid conduits (not shown). Each of the passageways 2 and 4 is provided with a radially inwardly extending annular shoulder 6 on the inner end thereof, to provide a jetting action of flow therethrough for purposes that will be subsequently discussed.

The valve body 1 is further provided with a vertically extending bore 8 in fluid communication with the passageways 2 and 4. The longitudinal axis of the bore 8 is intermediate of and transverse to the passageways 2 and 4. An upper portion 10 of the bore 8 may be circular and provided with threads, or the like, to removably receive and be closed by a circular, threaded valve body cap 12. The valve body cap 12 comprises an upper projection 14 shaped to receive a wrench or the like, to facilitate convenient removal of the cap 12 to expose the bore 8. A depending annular skirt 16 extends from the lower face of the cap, downwardly into the bore 8 and is provided with an annular groove 18 on the outer periphery thereof for reception of a circular O ring 20 or the like which acts as a fluid seal.

A mid portion 22 of the bore 8 is frustoconical in shape, having a major diameter at the upper end thereof adjacent to the lower end of the valve body cap 12 and a minor diameter at the lower end thereof subjacent the passageways 2 and 4. A lower portion 24 of the bore 8 is circular and of a relatively reduced diameter, this portion being defined by an annular, horizontally disposed valve body shoulder or base member 26 the upper face of which defines the lower extent of the frustoconical shape portion 22 of the bore 8.

Figure 3:
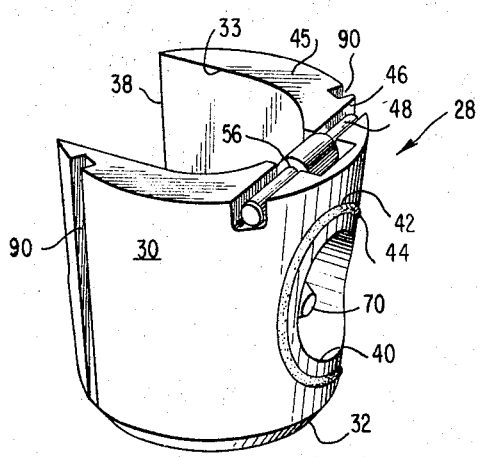
FIGURE 3 is a perspective view of the clapper insert of the valve shown in FIGURE 1.

Rotatably positioned within the frustoconical portion 22 of the bore 8 is a frustoconical, cup-shaped insert 28. As shown in perspective in FIGURE 3, the valve insert 28 comprises a frustoconical, vertically extending side wall 30 and a horizontally disposed circular base member 32 spanning the lower end of the circular wall 30. The side wall 30 and base member 32 define a frustoconical-shaped bore 33. Centrally disposed on the lower face of the base member 32 is a circular, shaft-like projection 34 the lower end of which projects through the lower portion 24 of the bore 8. The lower, exposed face of the projection 34 has an arrow-shaped rib 36 cast or formed thereon to act as a directional indicia for purposes that will be discussed hereinafter. The frustoconical insert 28 is dimensioned so as to be snugly received in the frustoconical portion 22 of the bore 8 so that an annular space remains between the lower face of the insert base member 32 and the upper face of the valve body base member 26.

The insert 28 further includes a generally U-shaped cut-away portion or port 38 on the lateral side thereof adjacent to outlet passageway 4. The lower periphery of the cut-away portion 38 is coextensive with the lower periphery of a circular port 40 positioned in opposed relation to the U-shaped port 38 on the other lateral side of the insert. The port 40 registers with the inlet passageway 2. An annular groove 42 is concentrically positioned about the port 40. The groove 42 receives a circular, O ring 44 which sealingly abuts the valve body walls defining the frustoconical portion 22 of the bore 8 around the inlet passageway 2 of the valve body 1.

A horizontally disposed upper face 45 of the insert 28 includes a transversely extending, horizontally disposed, elongated U-shaped groove 46. Rotatably and slidably received in the groove 46 is a circular, elongated clapper shaft 48. The shaft dimensions are less than the corresponding dimensions of the groove 46 making removal and freedom of adjustment convenient. On a mid portion of the shaft 48 a clapper assembly 50 is mounted. The clapper assembly 50 comprises a disc-shaped valve member 52 having a hinge or lug 54 provided on the upper periphery thereof, the lug 54 including a transversely disposed bore 56 for slidable and rotatable reception of the shaft 48. A threaded bore 58, in communication with the transversely disposed bore 56 is provided in the lug 54, for the reception of a threaded set screw 60, or the like, for fixedly positioning the lug 54 on the shaft 48. It will be appreciated that, should it become necessary because of misalignment caused by wear or deformation, the clapper may be adjusted as desired. Further, because the shaft 48 is generally free in the U-shaped groove 46, wear is automatically compensated for and binding is circumvented. Also, the entire clapper assembly 50 may move upwardly to accommodate passage of large objects.

Concerning the clapper per se, the upstream face of the valve member 52 adjacent the inlet passageway 2 of the valve body 1 is provided with a circular recess 62 for reception of an annular, stepped, resilient and flexible seal 64, a portion of which is in abutment with and overlapped by an annular shoulder 66 on the outer periphery of a circular retainer plate 68.

The upstream face of the retainer plate 68 is provided with a centrally disposed, tapered nose 70 projecting in an upstream relationship. The nose 70 has a circular, internal threaded bore 72 for threaded engagement with a stud 74 on the upstream face of the valve member 52. A set screw 75 is threadedly received in the retainer plate 68 for abutment against the upstream face of the valve member 52 to thereby facilitate adjustment and locking of the plate and the seal.

As suggested in FIGURE 1 by the dotted lines, the clapper assembly 50, when acted upon by fluid flow, is pivotable from a lower or closed position wherein the lower end of the clapper assembly is received in a semicircular wedge shaped recess 76 in the upper face of the base member 32 of the insert 28. The extent of such pivoting is dependent upon the magnitude of fluid flow or the size of the objects carried therein. However, if required, the entire clapper may be lineally or rotatably moved to a position higher than that suggested in FIGURE 1.

As the clapper swings it moves through an arc which may be outwardly of the inner periphery of the U-shaped recess 38. It will be seen that the provision of the U-shaped recess 38 and the wedge-shaped recess 76 aids in reducing turbulence through the valve but also facilitates the utilization of a clapper assembly of a larger diameter than would be normally free to pivot from a lower closed position to a higher than usual full open position without necessitating increase in the size of the required diameter of the insert. This is significant because it is sometimes desired to substitute a clapper valve in a valve housing intended for a plug valve and insert. Because of the operational characteristics of these valves in the past, such a substitution sometimes necessitated using a smaller capacity clapper than the replaced plug valve thereby increasing the resistance of flow through the valve. Utilizing an insert of the present invention, such increase in resistance to flow is no longer provoked.

Referring to FIGURE 1, the base member 32 of the insert 28 is provided with a centrally disposed, vertically extending bore 78 to prohibit, during assembly, trapping fluid in the space between the lower face of the base member 32 and the base member 26 on the valve body 1. The lower portion 24 of the bore 8 may be counterbored, as at 80, to receive a circular resilient seal 82 forming a fluid seal between the base member 26 of the valve body 1 and the projection 34 of the base 32. As heretofore disclosed, because of the dimensions of the base member 32 of the insert 28 in relation to the dimensions of the lower end of the frustoconical portion 22 of the bore 8, the lower face of the insert is maintained in spaced relation to the upper face of the base member 26 of the valve body 1 thereby forming a circular cavity 84 in fluid connection with a bore 86 threadedly receiving a plug 88. By removal of the plug 88, it is convenient to force chemical additives, or the like, through the annular cavity 84 and the bore 78 in the base 32 into the fluid passage area of the valve.

Figure 2:
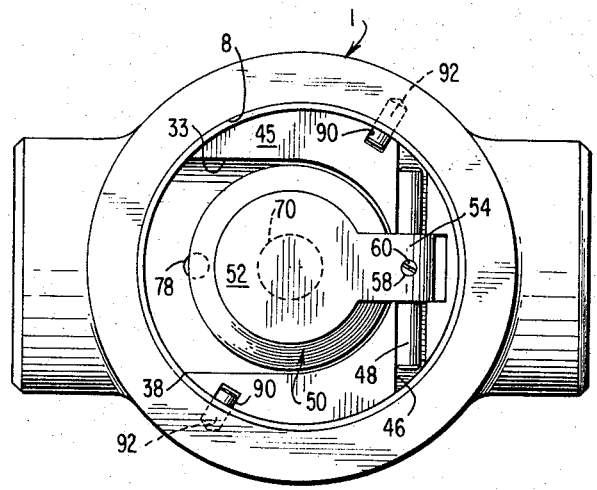
FIGURE 2 is a top, horizontal view of the swing-type valve shown in FIGURE 1, but shown with the valve body cap removed for purposes of illustration.

To maintain the insert ports 38 and 40 in rotational alignment with the inlet and outlet passageways 2 and 4 of the valve body 1, the outer periphery of the insert 28 is provided with a pair of opposed, elongated, vertically extending grooves 90 which slidably receives a pair of cooperating, opposed pins 92 fixedly received in apertures in the valve body 1 as shown in FIGURE 2.

The operation of the swing-type valve according to the present invention is as follows. Upon the introduction of fluid under pressure in the inlet passageway 2 of the valve body 1, a jet of fluid acts upon the tapered nose 70 of the clapper assembly 50 to pivot or swing the clapper assembly to its upper or open position as shown in dotted lines in FIGURE 1. The annular shoulders 6 on the inboard end of the inlet passage 2 act to confine and direct the flow of fluid to form a jet directed at the nose 70. This action effectively maintains the clapper assembly in a raised position. However, this action also insures the positioning of the clapper seal 62 in an elevated position so as not to be directly impinged upon by the jet thereby eliminating the resultant wear on the seal. Of course, should the size of an object carried by the fluid flowing through the valve require that the nose 70 be elevated to a higher position, the clapper assembly 50 is free to be so raised, by rotation and/or upward linear movement to be received internally of the annular skirt 16 on the valve body cap 12.

Should a reversal of the positioning of the clapper assembly 50 be desired, as when fluid is pumped in a reverse direction, it is merely necessary to remove the valve body cap 12, raise the insert 28 in the bore 8, rotate 180°, and reposition the insert 28 in a bottomed condition. As will be apparent, the passageway 4 is then an inlet and the passageway 2 an outlet.

It should be noted that the bore 78 in the insert base member 32 prevents trapping fluid and the lower face of the annular skirt 16 acts about the full periphery of the upper end 45 of the insert 28 to induce an even seating thereof. Binding or cocking of the insert and the consequential misalignment is circumvented. Since there is no direct mechanical connection between the cap 12 and the insert 28, the cap 12 may assume an identical position or elevation within the bore 8 regardless of the direction in which flow is checked and the consequential orientation of the insert 28 within the bore.

Also, as will be obvious, to inspect the clapper assembly, it is merely necessary to remove the cap 12 and raise the entire clapper assembly 50 with the shaft 48 being lifted out of the transverse groove 46. In this regard, upon reassembly, the annular skirt 16 on the cap 12, functions not only to evenly position the insert 28 but also functions to limit the upward movement of shaft 48 in the groove 46 by virtue of the fact that the skirt 16 abuts the upper face 45 of the insert 28 and overlaps the longitudinal ends of the shaft 48 and the groove 46. Not only is the clapper assembly free to rotate as required but it is also free to raise in a lineally upward direction from the dotted line position shown in FIGURE 1 as required by flowing objects and the like.

Should wear or deformation of the clapper or seal occur, the clapper of the present invention may be conveniently adjusted on its supporting shaft to compensate for such. Further, because the clapper shaft is freely supported in the U-shaped groove of the insert, a significant degree of such compensation is automatically achieved.

Although in the preferred embodiment the base 32 of the insert 28 is provided with a circular projection 34 the lower end of which has indicia 36 for indicating the orientation of the insert and clapper within the valve body without removal of the valve body cap 12, it will be appreciated that the projection 34 and the bore 24 in the valve body 1 may be eliminated so the lower end of the valve body 1 is closed.

While the invention has been described with reference to a preferred embodiment, it will be apparent to those skilled in the art that additions, deletions, modifications, substitutions and other changes in the specifically described and illustrated preferred embodiment may be made which will fall within the purview of the appended claims.

I claim:

1. A swing-type valve comprising a valve body having first and second fluid passageways in fluid communication with a valve body bore the longiutdinal axis of which is transversed to said passageways, said valve body bore being open on at least one longitudinal end thereof, and having a frustoconical portion adjacent said open end, closure means for closing said open end of said valve body bore a frustoconical insert rotatably mounted in said bore, said insert having opposed first and second ports in fluid communication with an insert bore, said ports registrable with either of said first and second passageways, a clapper pivotally mounted on said insert and within said insert bore, said clapper registrable with one of said opposed ports, the other of said opposed ports being formed by a generally U-shaped recess extending from an upper end of said frustoconical insert adjacent the major diameter thereof towards a lower end of said frustoconical insert coextensively with the lower periphery of said one of said opposed ports.

2. A swing type valve according to claim 1 wherein said clapper is pivotally mounted in recess means in said insert, said recess means opening toward said one longitudinal end of said valve body bore.

3. A swing type valve according to claim 2 wherein said recess means is dimensioned to support said clapper assembly for linear movement in a direction parallel to said longitudinal axis of said valve body bore toward said one longitudinal end of said valve body.

4. A swing-type valve comprising a valve body having first and second fluid passageways and a bore in fluid communication with said passageway, said bore having a longitudinal axis transversely of said passageways, said bore being open on one longitudinal end and defined adjacent the other longitudinal end by a valve body base member extending transversely of the longitudinal axis of said bore, said bore having a frustoconical-shaped portion intermediate said longitudinal ends, a valve body cap removably positioned in said open end of said bore, a frustoconical-shaped insert rotatably mounted within said frustoconical-shaped portion of said bore for linear movement longitudinally of said bore, means for restraining rotation of said insert relative to said valve body bore, said insert including a frustoconical-shaped side wall defining a longitudinally extending insert bore open on one longitudinal end, said side wall including a pair of opposed ports leading to said insert bore, said ports registrable with said valve body passageways, an insert base member adjacent the minor diameter of said insert frustoconical-shaped side wall and spanning the longitudinal end thereof, a portion of said insert base member adjacent to but spaced from said valve body base member, a fluid pressure relieving passageway in said insert base member for maintaining said insert bore in fluid communication with the space between said portion of said insert base member and said valve body base member, a third passageway in said valve body in fluid communication with said space, a plug removably positioned within said third passageway, a clapper assembly pivotally mounted within said insert bore, said clapper assembly registrable with one of said ports in said insert, the other of said opposed ports being formed by a generally U-shaped recess extending from an upper longitudinal end of said frustoconical insert adjacent the major diameter thereof towards a lower longitudinal end of said frustoconical insert coextensively with the lower periphery of said one of said opposed ports, said clapper assembly comprising a shaft transversely disposed relative to the longitudinal axis of said bore, a clapper slidably positioned on said shaft, means restraining sliding movement between said clapper and said shaft, said shaft rotatably supported in a generally U-shaped recess in the upper longitudinal end of said frustoconical-shaped side wall at the major diameter thereof, said recesses having dimensions greater than the corresponding dimensions of said shaft, said shaft being supported in said recess for linear movement in direction transverse and parallel to the longitudinal axis of said bore, said insert base member including a face having a semicircular, wedge shaped recess receiving one end of said clapper.

5. A swing-type valve comprising a valve body having a first and second fluid passageway in fluid communication with a valve body bore the longitudinal axis of which is intermediate of and transverse to said passageways, said valve body bore being open on at least one longitudinal end and having a frustoconical-shaped portion, a frustoconical-shaped insert rotatably mounted in the frustoconical-shaped portion of said valve body bore for linear movement longitudinally of said valve body bore, said insert having first and second ports in fluid communication with an insert bore transversely thereof, each of said ports registrable with either of said first and second passageways, means for restraining rotation of said insert relative to said valve body bore, a clapper assembly in said insert bore registrable with one of said ports, recess means in said insert opening toward said one longitudinal end of said valve body pivotally supporting said clapper assembly on said insert, a circular valve body cap removably mounted in said open end of said valve body bore and contacting the upper end of said insert at the major diameter thereof for preventing lineal movement by said insert longitudinally of said bore and superimposed over said recess means in said insert for limiting movement of said clapper assembly, and said means for restraining rotation of said insert relative to said valve body bore including a pair of opposed, radially inwardly projecting pin means in said valve body, said pin means slidably received in longitudinally extending grooves in the external periphery of said frustoconical-shaped insert so as to permit linear movement between said insert and said valve body along the longitudinal axis of said bore but to restrain rotational movement therebetween.

References Cited

UNITED STATES PATENTS

| 280,011 | 6/1883 | Bradley | 137—269.5 |
| 294,960 | 3/1884 | Blessing | 137—527.2 |
| 558,708 | 4/1896 | Baldwin | 251—312 X |
| 2,151,098 | 3/1939 | Greenwood | 137—269.5 |
| 2,918,934 | 12/1959 | Wheatley | 137—527.2 |
| 3,155,112 | 11/1964 | Rosser | 137—527.8 |

M. CARY NELSON, *Primary Examiner.*

MARTIN P. SCHWADRON, *Examiner.*

R. J. MILLER, *Assistant Examiner.*